E. C. SCHINKE AND N. A. SUTHERLAND.
CALCULATING MACHINE.
APPLICATION FILED MAY 1, 1919.
1,396,886.
Patented Nov. 15, 1921.
10 SHEETS—SHEET 6.
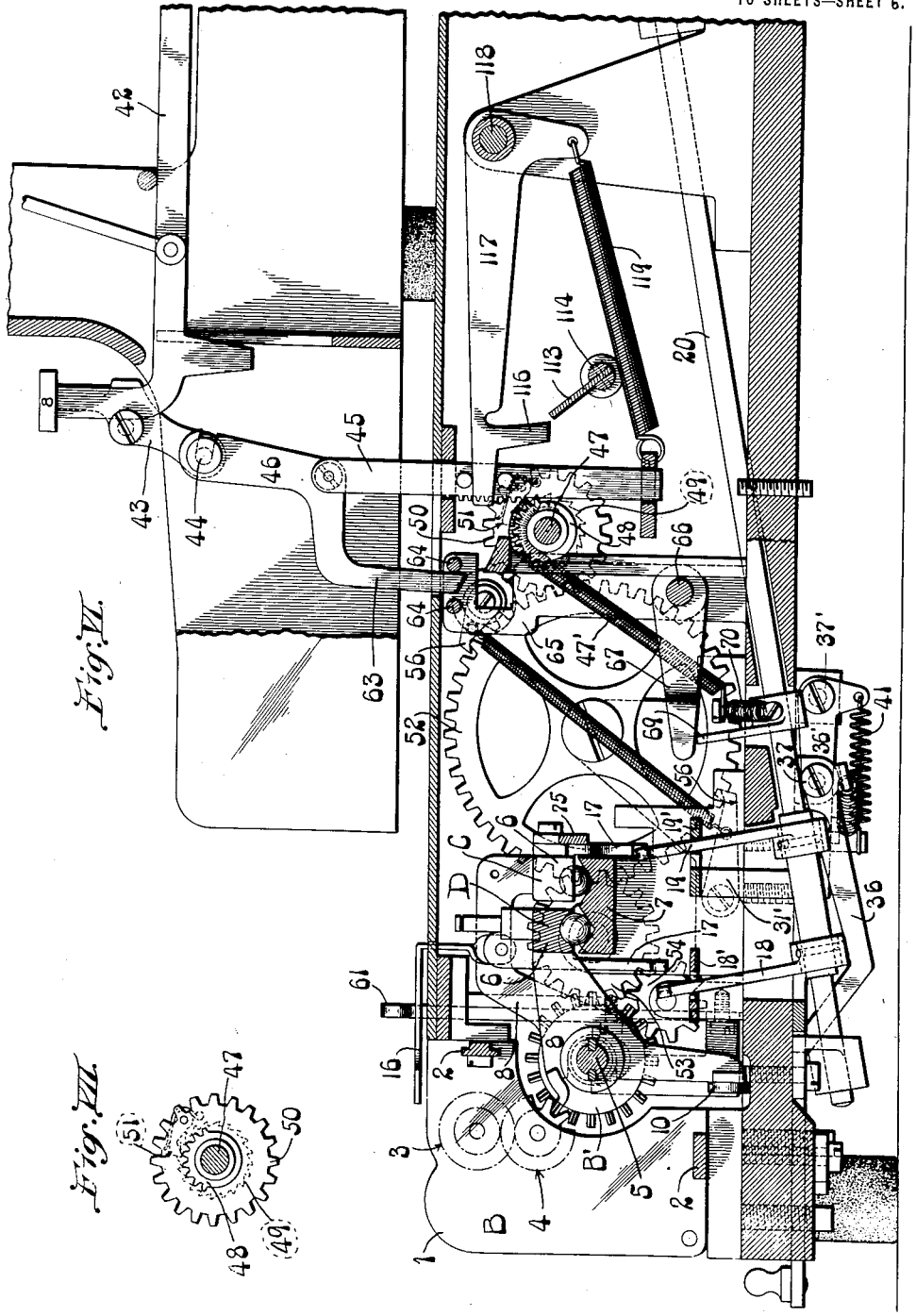
Attest.
Charles A. Becker.
Inventors.
E. C. Schinke and N. A. Sutherland,
by Knight Cook
Their Attorneys.

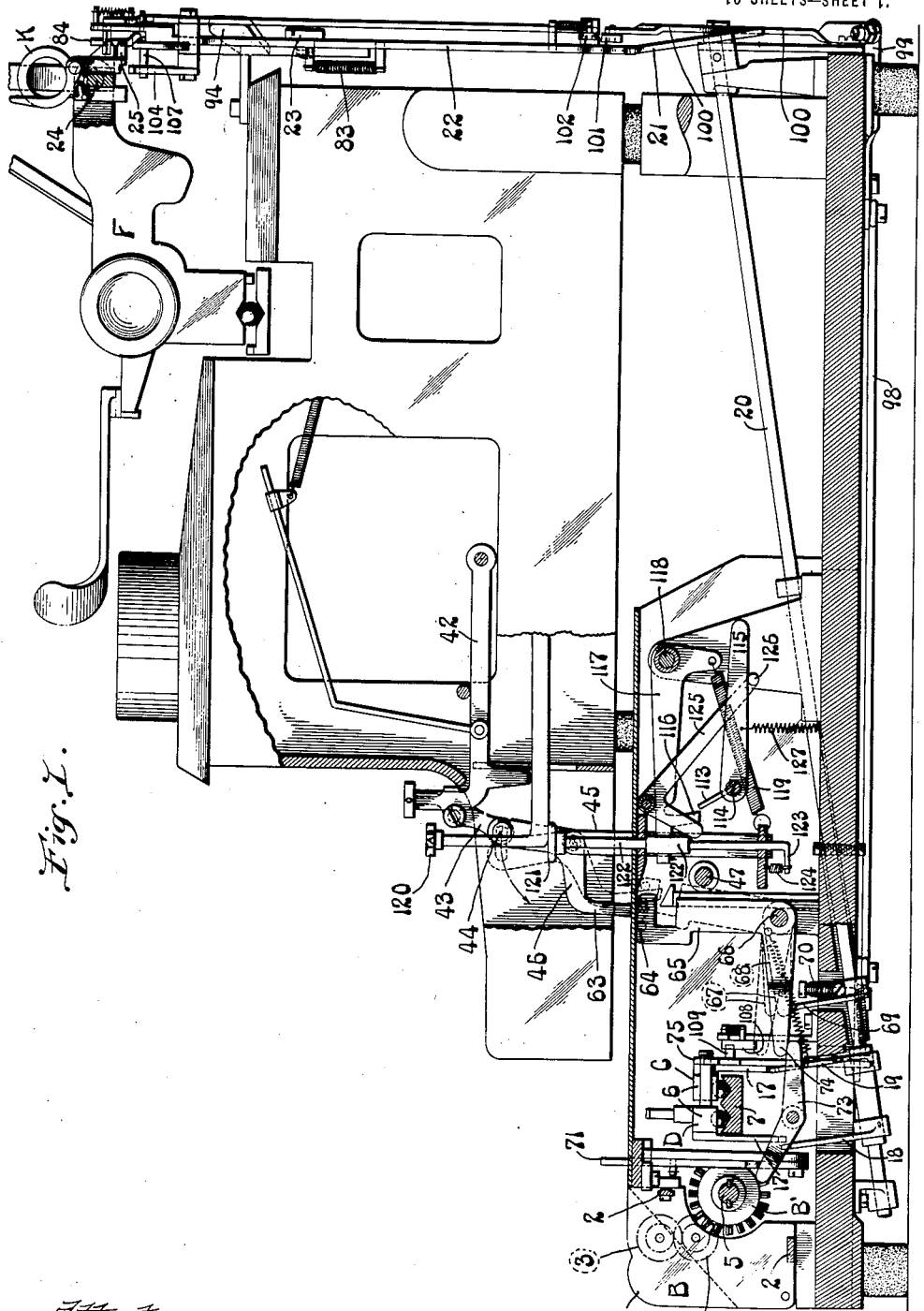

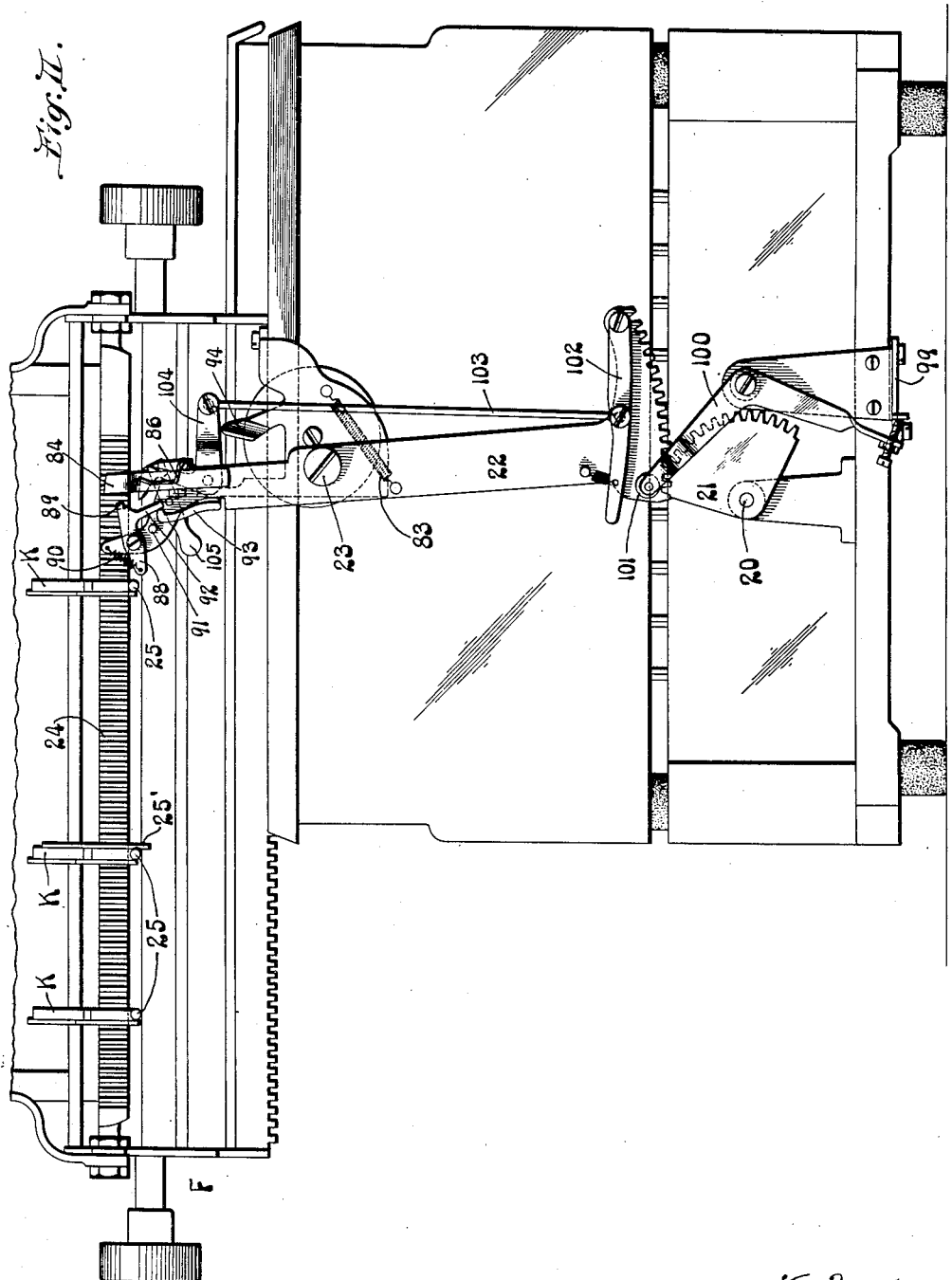

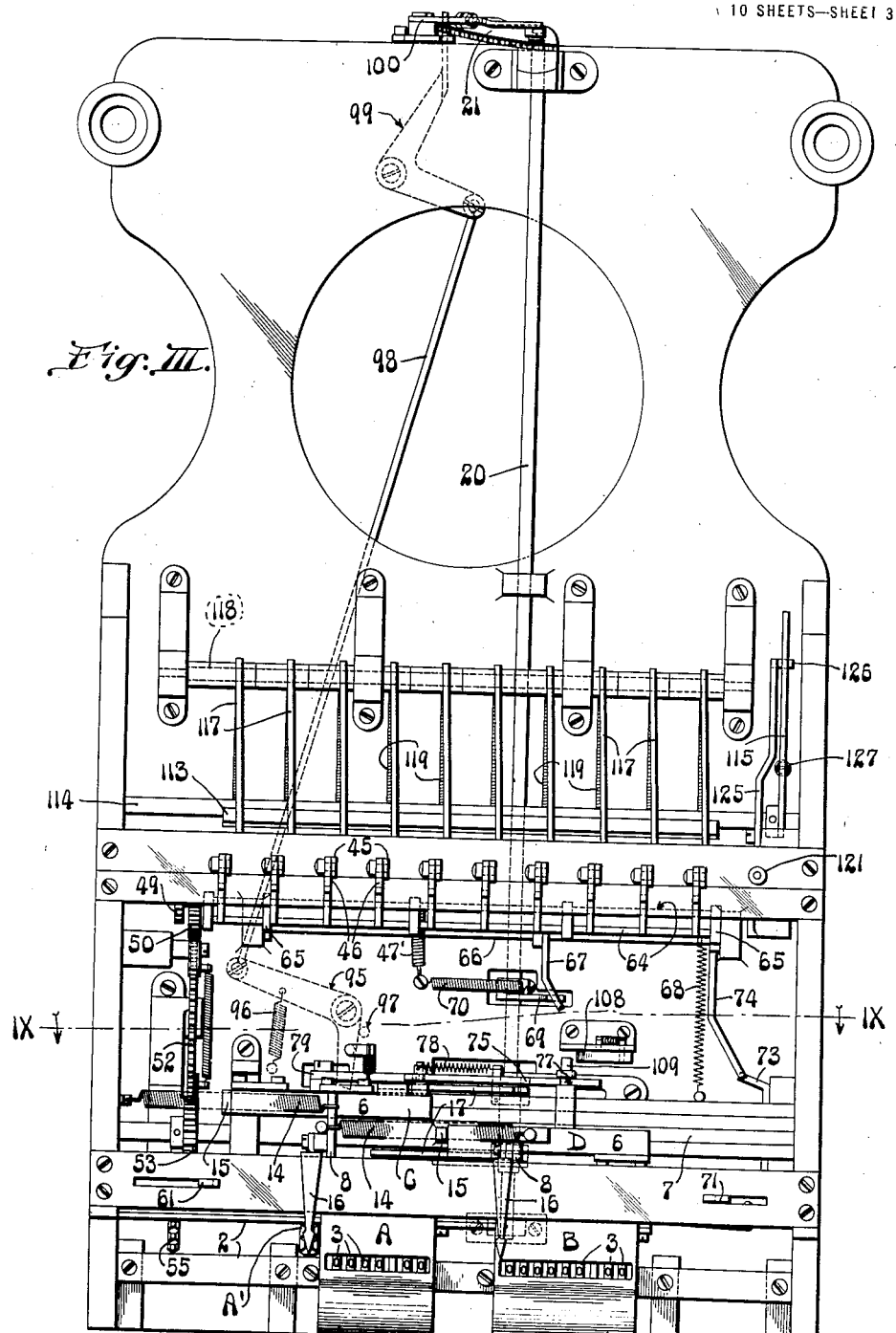

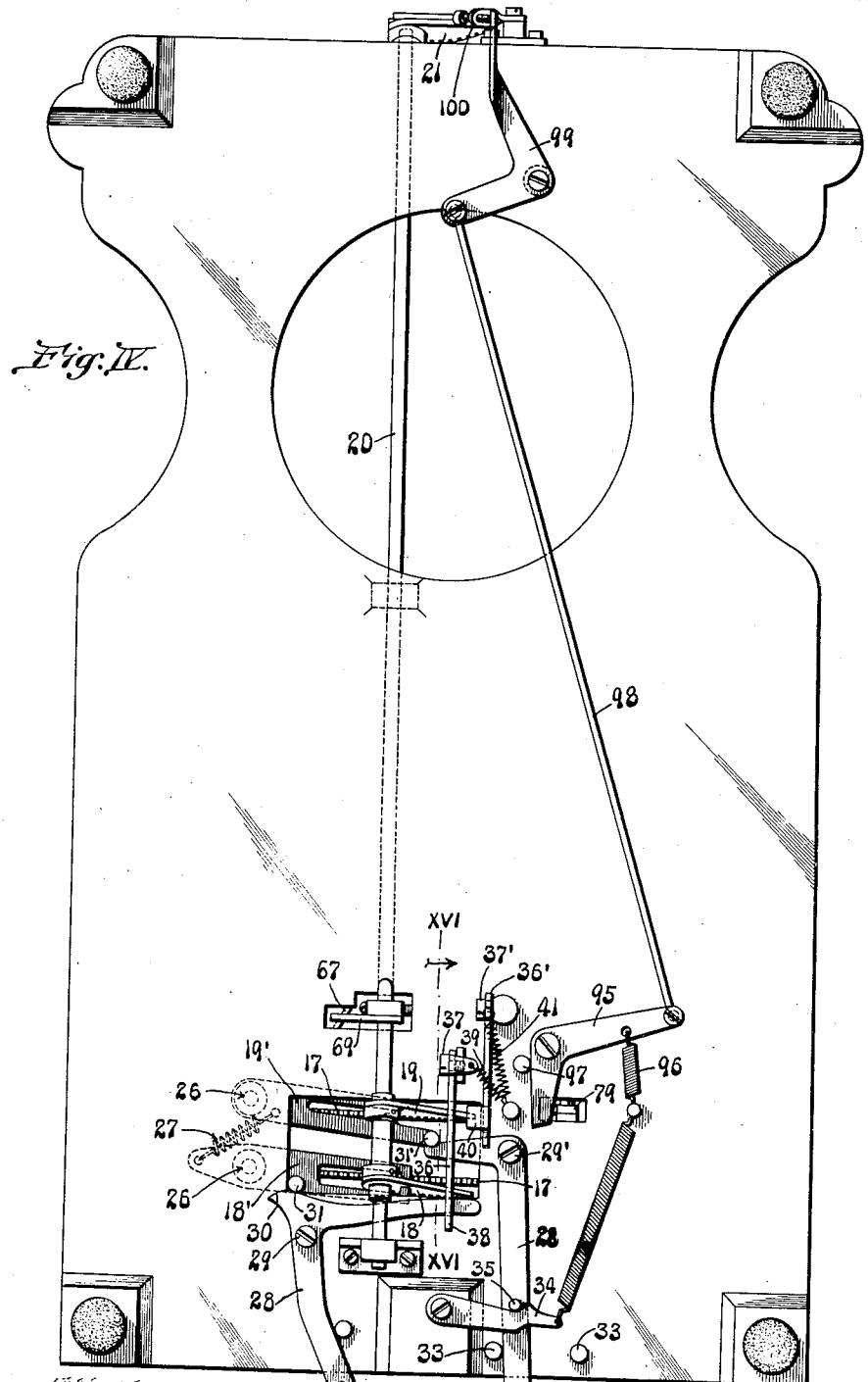

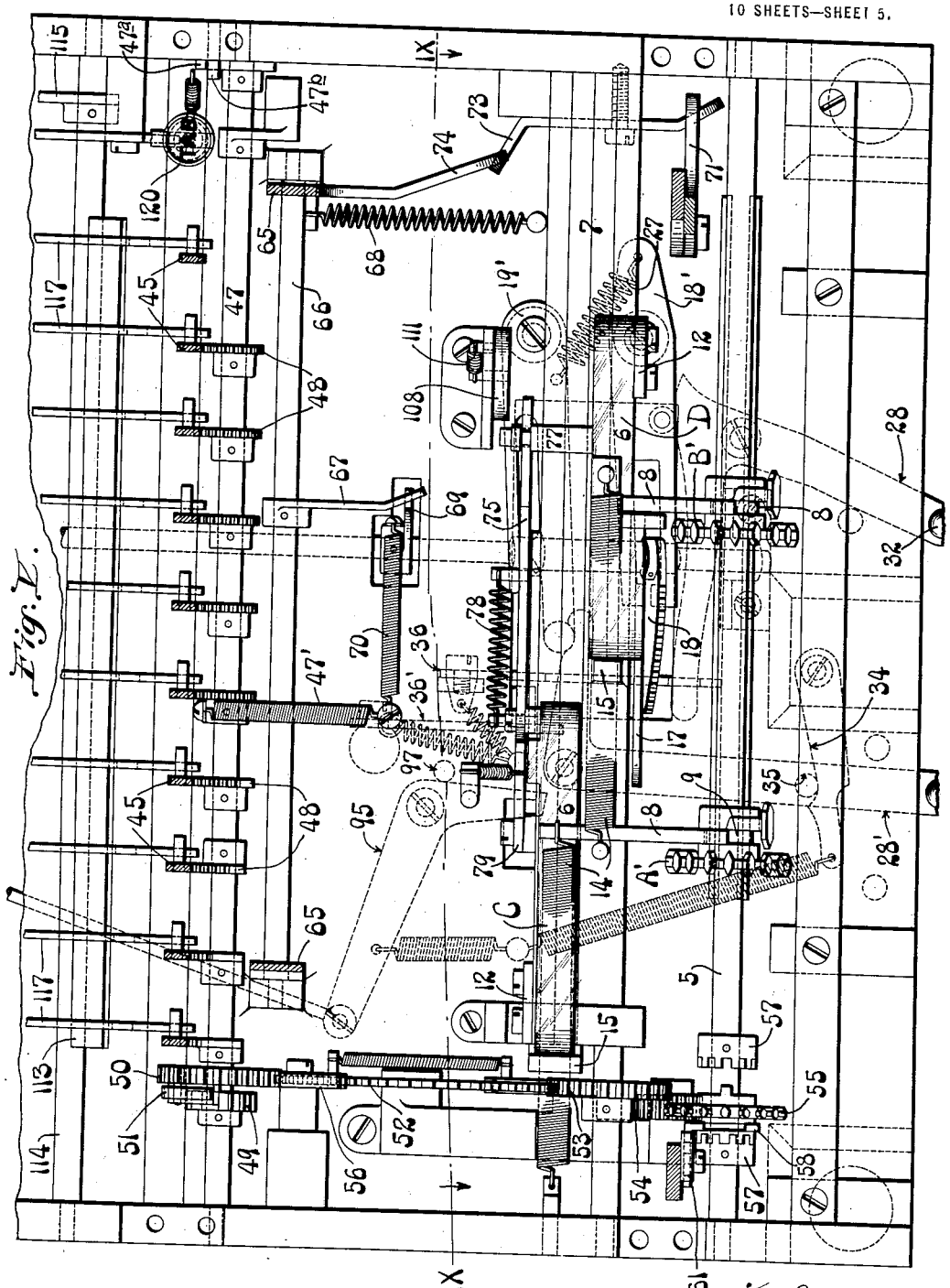

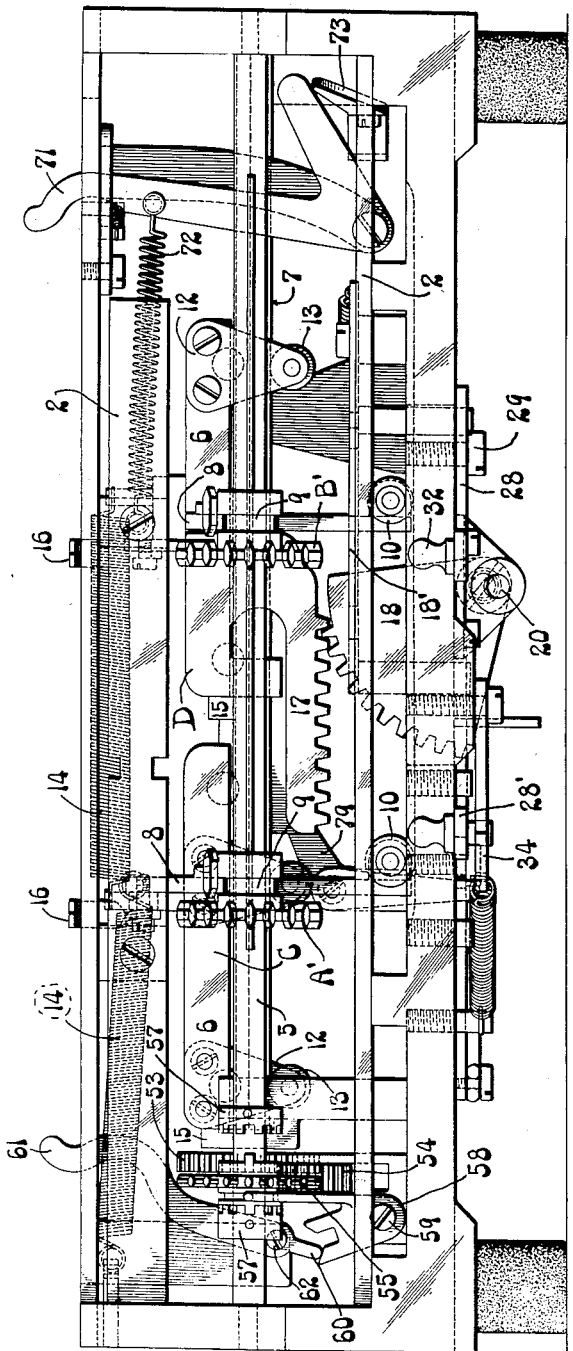

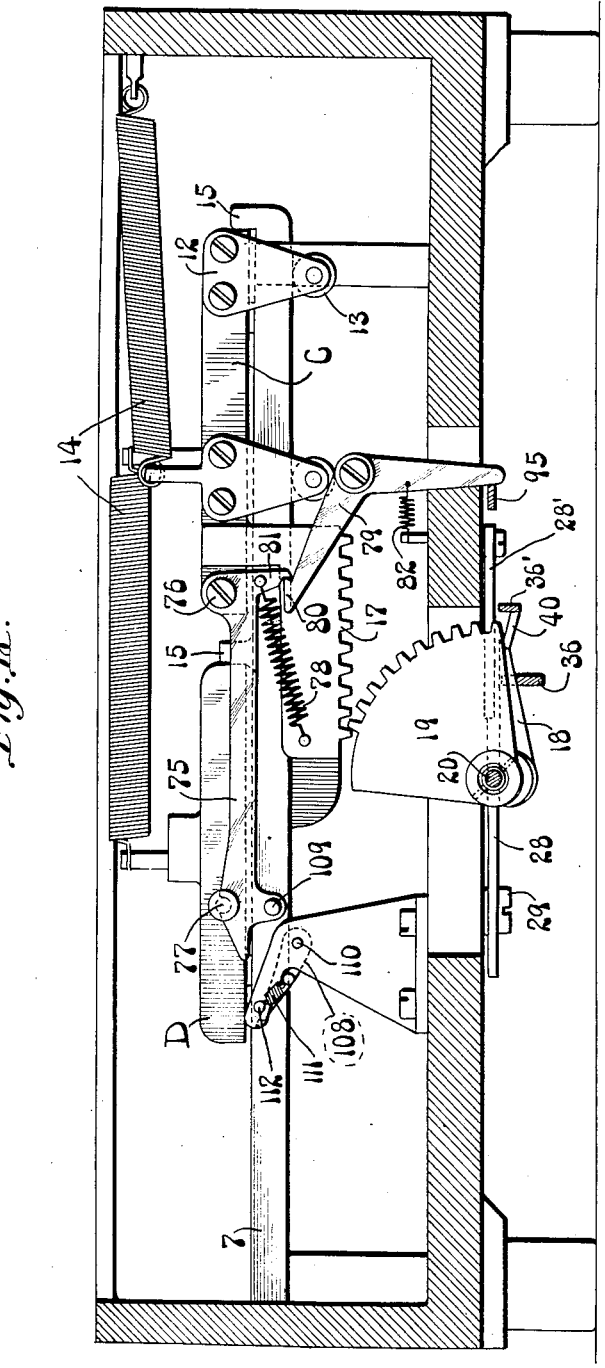

E. C. SCHINKE AND N. A. SUTHERLAND.
CALCULATING MACHINE.
APPLICATION FILED MAY 1, 1919.
1,396,886.
Patented Nov. 15, 1921.
10 SHEETS—SHEET 9.
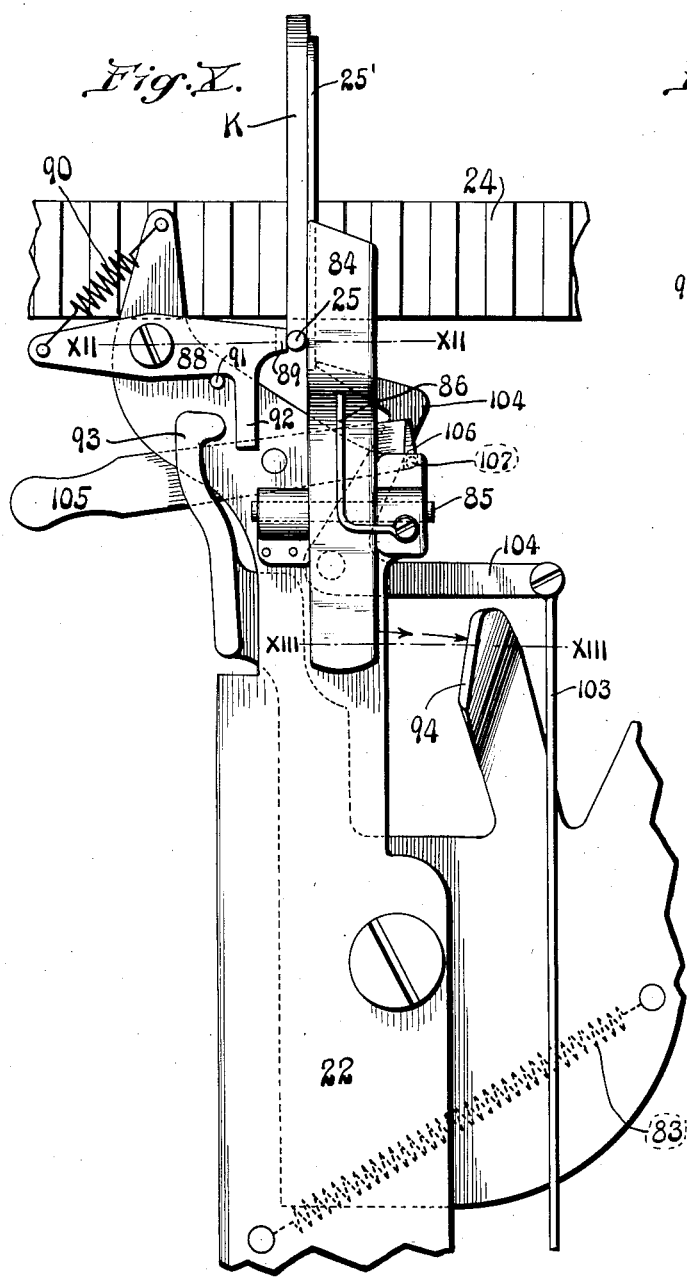
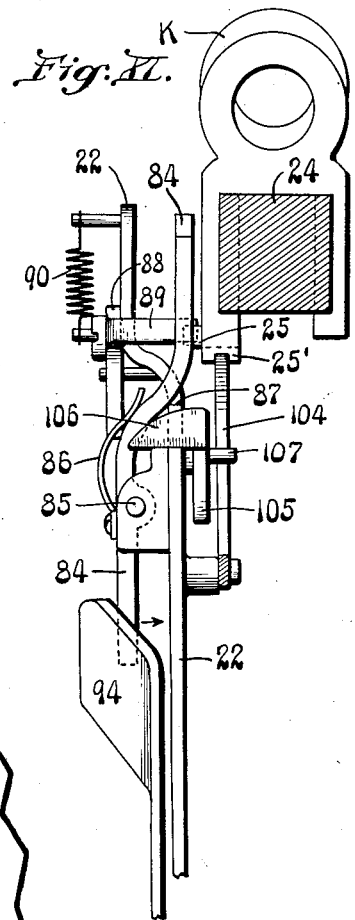
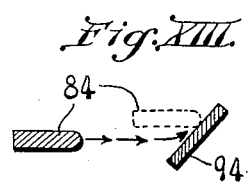
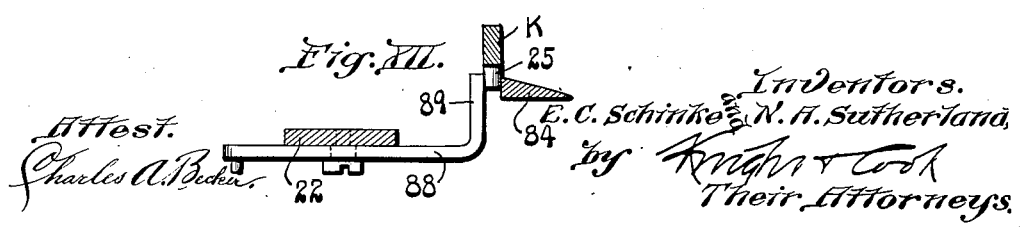

E. C. SCHINKE AND N. A. SUTHERLAND.
CALCULATING MACHINE.
APPLICATION FILED MAY 1, 1919.
1,396,886.
Patented Nov. 15, 1921.
10 SHEETS—SHEET 10.
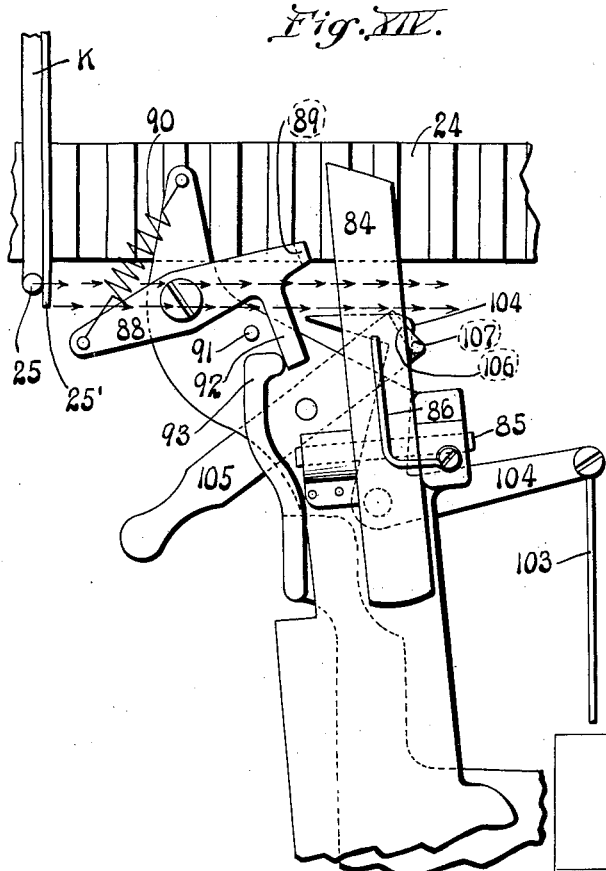
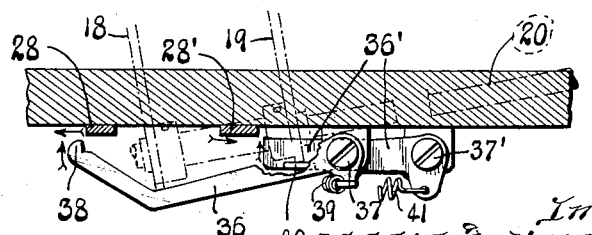

UNITED STATES PATENT OFFICE.

EDWARD C. SCHINKE AND NORMAN A. SUTHERLAND, OF ST. LOUIS, MISSOURI, ASSIGNORS TO TYPEWRITER CALCULATING ATTACHMENT COMPANY, OF ST. LOUIS, MISSOURI, A CORPORATION OF MISSOURI.

CALCULATING-MACHINE.

1,396,886.      Specification of Letters Patent.      Patented Nov. 15, 1921.

Application filed May 1, 1919. Serial No. 293,970.

*To all whom it may concern:*

Be it known that we, EDWARD C. SCHINKE and NORMAN A. SUTHERLAND, citizens of the United States of America, residents of the city of St. Louis, State of Missouri, have invented certain new and useful Improvements in Calculating-Machines, of which the following is a full, clear, and exact description, reference being had to the accompanying drawings, forming a part of this specification.

This invention relates to improvements in calculating machines, and more particularly to calculating mechanism adapted to be actuated by the numeral keys and platen carriage of an ordinary typewriter. One of the objects of the invention is to provide an improved means for actuating and controlling a plurality of accumulators, or totalizers. The machine herein shown is provided with two accumulators, viz., an individual accumulator wherein individual items are temporarily registered, and a grand accumulator adapted to indicate the total of all of the individual items. The individual items can be subtracted from the individual accumulator without in any way affecting the grand accumulator, and when necessary the grand total can be subtracted from the grand accumulator without affecting the individual accumulator.

Each accumulator is provided with an actuator and a traveling denominational carriage, movable step by step to change the denominational relation of the actuator to the accumulator, thereby providing for the transmission of movement to a series of total wheels of different orders. The actuator just referred to may be a rotary master wheel, and it may be carried by the denominational carriage so as to advance one step in response to each operation of the numeral keys. In the structure we have shown, each denominational carriage is driven by the traveling platen carriage of an ordinary typewriter.

An object of the invention is to provide an improved controlling means including automatic selectors whereby the accumulators are selected. These automatic selectors may be carried by the platen carriage of the typewriter, and they may be used to transmit motion from said platen carriage to the operating mechanism whereby the denominational carriages are driven. In the preferred form of the invention, the denominational carriages are detachably connected together, and one of the automatic selectors is used to transmit motion to both denominational carriages at the same time, while another of the automatic selectors is used to disconnect the denominational carriages from each other, so that only one of them will be driven by the platen carriage.

Another object of the invention is to produce a calculating machine having a plurality of accumulators, and also having manually operated selectors whereby the operator may select either of the accumulators. These manually operated selectors control the transmission of movement to the denominational carriages of the different accumulators, and after one of the carriages has been selected it travels step by step, from one order to another, in response to the movements of the operating means. When both denominational carriages are selected, they travel simultaneously and the denominational position of one carriage always corresponds to the denominational position of the other carriage. In other words, when the denominational carriage of the grand accumulator is in the hundreds order, the denominational carriage of the individual accumulator is also in the hundreds order, and the amount to be added is simultaneously registered in both accumulators. Obviously, it is desirable to prevent the operator from accidentally selecting one of the denominational carriages when its denominational position does not agree with the other denominational carriage, for if such a selection is made the numbers will be improperly registered in one of the accumulators.

Therefore, another object of the invention is to provide an error-preventing means coöperating with the manually operated selectors to prevent the selection and operation of a plurality of denominational carriages in different denominational positions. More specifically stated, in the machine we have shown, either or both of the denominational carriages may be selected when both occupy their starting positions, but after a selected carriage has started its movement, an operator cannot then select the other carriage. In this particular structure, if both carriages are to be operated, they must begin their motion at the same time, and after one carriage has been displaced from its starting position, the other carriage cannot be selected. The manually operated selector associated with the idle carriage is automatically locked when the active carriage passes from its starting position.

A further object of the invention is to permit the denominational carriages to return independently of each other, thereby permitting one of the carriages to be selected and stopped before it returns to the starting position, while the other carriage is permitted to continue in motion and return to the starting position.

Another object is to produce a simple and inexpensive means for automatically connecting the numeral keys with the calculating mechanism when a denominational carriage passes from its starting position.

An ordinary typewriter is usually provided with a tabulating key, which may be depressed with the result of permitting the platen carriage to move quickly to a predetermined position, and when the tabulating key arises from its lowermost position, the platen carriage is usually permitted to jump a slight distance. It sometimes happens that an operator will depress the tabulating key and then strike a numeral key while the tabulating key is in the depressed position. In this event, if the denominational carriage is driven with the platen carriage, the numeral may not be properly recorded, for the denominational carriage will not reach its proper position until the tabulating key arises from its depressed position. In the machine we have shown, the calculating mechanism is rendered inoperative when the tabulating key occupies a depressed position, and this is accomplished through the medium of a stop device which prevents operation of the numeral keys, as will be hereinafter described.

With the foregoing and other objects in view the invention comprises the novel construction, combination and arrangement of parts hereinafter more specifically described and illustrated in the accompanying drawings wherein is shown the preferred embodiment of the invention; however, it is to be understood that the invention comprehends changes, variations and modifications which come within the scope of the claims hereunto appended.

Figure I is a vertical section, partly in elevation, illustrating the calculating machine and the typewriting machine mounted thereon, so as to transmit movement thereto.

Fig. II is a rear elevation of the combined structure shown in Fig. I.

Fig. III is a top or plan view of the base and the calculating mechanism mounted therein, the typewriter being omitted.

Fig. IV is an inverted plan view of the base, showing a part of the means through which motion is transmitted from the typewriting machine to the calculating mechanism, and showing the manually operated selectors.

Fig. V is an enlarged top or plan view of the calculating mechanism near the front of the machine, the accumulators being omitted.

Fig. VI is a vertical section of the mechanism shown in Fig. V.

Fig. VII is a detail view illustrating the ratchet device through which motion is transmitted from the numeral keys.

Fig. VIII is a front elevation of the calculating mechanism, the accumulators being omitted.

Fig. IX is a transverse section taken approximately on the line IX—IX, Figs. III and V, looking toward the front of the machine.

Fig. X is an enlarged rear elevation of the elements at the rear upper portion of the machine, showing the automatic selectors on the platen carriage and some of the elements through which motion is transmitted from said selectors.

Fig. XI is a side elevation of the parts shown in Fig. X.

Fig. XII is a horizontal section on the line XII—XII, Fig. X.

Fig. XIII is a horizontal section on the line XIII—XIII, Fig. X.

Fig. XIV is a view similar to Fig. X, showing the parts as they appear when rendered inoperative to permit the platen carriage to travel independently of the calculating mechanism.

Fig. XV is a horizontal section similar to Fig. XII, showing the trippable finger as it appears when displaced to an inoperative position beyond the path of the traveling pin.

Fig. XVI is a fragmentary longitudinal section showing the error-preventing means whereby the manually operated selectors may be automatically locked.

Fig. XVII illustrates an example of work which may be done by the machine.

Briefly stated, the machine about to be described is a calculating attachment for typewriters, and it is adapted for use with ordinary typewriting machines now on the market. The numbers to be added are written by the typewriter and the total is indicated by an accumulator, or by a plurality of accumulators. Each of the accumulators herein shown comprises a series of total wheels of different order, and motion is transmitted from a master wheel to the total wheels. Either the master wheel or the accumulator must travel step by step in response to the key operations, so as to change the denominational relation of the master wheel to the accumulator. The master wheel is therefore splined to a rotary shaft and carried by a master wheel carriage, or denominational carriage, adapted to travel in unison with the platen carriage of the typewriter. The master wheel is rotated through the medium of the numeral keys of the typewriter.

*The accumulators.*

We do not deem it necessary to point out all of the details of construction of an accumulator, such devices being old and well-known in the art, and no claim is herein made for an accumulator *per se*. To illustrate certain features of the invention, we have shown in a more or less conventional manner an individual accumulator A (Fig. III) wherein individual items are frequently added and thereafter subtracted for the purpose of clearing the accumulator, and a grand accumulator B (Figs. I, III and VI) adapted to indicate the grand total of all of the individual items. As will be hereinafter described, these accumulators may be actuated simultaneously, and they may be actuated independently of each other for either addition or subtraction.

Each accumulator herein shown comprises a housing 1 adjustably mounted on long horizontal bars 2 at the front of the machine. Each housing is provided with total indicating wheels 3, (Figs. I, III and VI) which may be viewed through a sight opening in the top of the housing, and transmission wheels 4 meshing with the total wheels 3 and adapted to be driven by a master wheel. A′ designates the master wheel associated with the individual accumulator, and B′ designates the master wheel for the grand accumulator. These master wheels are shown in Figs. I, III, V, VI and VIII. Both master wheels are splined to a rotary shaft 5, and when in service they travel step by step, longitudinally of the shaft 5, so as to successively mesh with the transmission wheels 4 in the accumulator. The master wheel shaft 5 is rotated through the medium of the numeral keys, as will be hereinafter described.

C designates a carriage for advancing the master wheel A′, and D is a similar carriage for the master wheel B′. Each of these carriages comprises a long horizontal bar 6 mounted over a double track 7, and an arm 8 extending forwardly from the bar 6. The hub of each master wheel has a circular groove 9 for the reception of one of the arms 8 (Figs. V and VIII), and each arm 8 is extended downwardly from the master wheel hub to receive a wheel 10, which travels on a horizontal track. Anti-friction balls may be interposed between the double track 7 and the master wheel carriages C and D, as shown in Fig. VI. Webs 12 (Figs. V and VIII), depending from the master wheel carriages, may be provided with rollers 13 which lie under the track 7 to retain the carriages on the track. Individual restoring springs 14 (Figs. III, V, VIII and IX) connect the master wheel carriages to stationary parts of the machine, and these restoring springs tend to retain the carriages in their starting positions wherein they engage stop members 15. Pointers 16 (Figs. III and VI), carried by the master wheel carriages, serve as means for indicating the denominational positions of the master wheels relative to the accumulators.

*Feeding the master wheels.*

To change the denominational relation of the master wheels to the accumulator, each of the master wheels A′ and B′ is movable step by step along the master wheel shaft 5, and these movements are obtained by transmitting power from the platen carriage of the typewriter to the different master wheel carriages C and D. Each master wheel carriage is provided with a toothed rack 17 (Figs. VI and VIII), and these racks are adapted to mesh with sectors 18 and 19, the sector 18 being used to actuate a carriage D and the sector 19 being used to drive the carriage C. Both of the sectors 18 and 19 (Figs. I, IV, VI and IX) are pivotally secured to a long inclined oscillatory shaft 20, which extends approximately from the front to the rear of the machine. A sector 21 (Figs. I, II, III and IV) is rigidly secured to the rear end of the long shaft 20, and this sector 21 meshes with teeth at the lower edge of the long feeding lever 22, said lever being detachably secured to the typewriter by means of a pivot screw 23 (Figs. I and II).

F designates the platen carriage of the typewriter (Figs. I and II), said carriage being adapted to travel back and forth in a straight horizontal line, and it may be actuated in response to the key operations, as is well understood in this art, the carriage moving one step in response to each key operation. The rear portion of the platen carriage is provided with a long toothed horizontal bar 24 (Figs. I, II, X and XI), a bar of this kind being present in the carriages of several well known typewriters now on the market. K designates pin-carrying clips (Figs. I, II, X and XII) straddling the toothed bar 24 and adjustably mounted thereon. Each clip K is provided with a power transmission pin 25 adapted to coöperate with certain elements at the upper end of the long lever 22, for the purpose of transmitting movement from the platen carriage to said long lever 22. The abutment fingers at the upper end of the lever 22 coöperate in a peculiar manner with the pins 25, as will be hereinafter described, but it should now be understood that the long lever 22 oscillates in response to movement of the platen carriage, and that motion is thus transmitted from the long lever 22 to the sector 21 at the rear of the machine, and thence through the long inclined shaft 20 (Figs. I and II) to the sectors 18 and 19 which are adapted to mesh with the rack bars on the master wheel carriages. Motion is thus transmitted from the traveling platen carriage to the master wheel carriages, and since the sectors 18 and 19 (Figs. I, VI and IX) are pivoted to the long shaft 20, it will be readily understood that these sectors may be shifted and engaged with, or disengaged from, the rack bars, so that the operator can select either of the master wheel carriages and then shift the sectors 18–19 so as to transmit movement directly to the selected carriage.

*Manually operated means for selecting the accumulators.*

18' and 19' designate elongated forks (Figs. IV, V and VI) straddling the sectors 18 and 19, respectively, said forks being pivotally supported at 26, as shown most clearly in Fig. IV. 27 designates a spring connecting the forks 18' and 19'. This spring 27, acting upon the forks, tends to disengage the sectors 18 and 19 from the rack bars on the master wheel carriages. The forks may be shifted by hand for the purpose of shifting the sectors into and out of engagement with the rack bars. A bell crank lever 28, pivotally mounted at 29 (Figs. III and IV, is provided with a cam face 30 adapted to coöperate with a pin 31 extending from the fork 18'. This lever may be operated by hand with the result of transmitting movement through the cam face 30 and pin 31 to actuate the fork 18', thereby actuating the sector 18 so as to shift it into and out of engagement with the rack bar 17. The lever 28 therefore constitutes a hand operated selector for one of the accumulators, and it is provided at its front end with an operating knob 32. The sector 18, controlled by the lever 28, is used to transmit motion to the master wheel carriage D associated with the grand accumulator B.

To control the transmission of movement from the sector 19 to the master wheel carriage associated with the individual accumulator A, a selecting lever 28' (Fig. IV) is pivoted at 29' and provided with a short arm engaged by a pin 31' extending from the fork 19'. This lever 28' has an operating knob at the front of the machine, and its motion is limited by means of stop pins 33 (Fig. IV). 34 designates a spring-actuated detent coöperating with a pin 35 on the lever 28', to yieldingly retain said lever in the position to which it is shifted. Obviously, the selecting lever 28' may be operated by hand to transmit movement to the fork 19' whereby the sector 19 is shifted and engaged with, or disengaged from, a rack bar 17.

When the master wheel carriages are driven simultaneously, the master wheels always occupy corresponding denominational positions. For example, in introducing the item "20" into both accumulators at the same time, the numeral 2 must be added in the tens order in both accumulators. It will, therefore, be understood that the denominational positions of the two active master wheels must agree with each other, and that it is desirable to prevent the operator from accidentally selecting and operating the master wheels in different denominational positions. The manually operated selecting levers 28 and 28' may be actuated independently of each other to select either or both of the master wheels, but this selection must be made when the master wheels occupy their starting positions; *i. e.*, when the master wheels occupy corresponding denominational positions.

We will now describe the error-preventing locking means whereby the selecting lever of one accumulator is locked when the master wheel of the other accumulator passes from its starting position. 36 designates a locking dog (Figs. IV and XVI) pivoted at 37 and provided with a tooth 38 adapted to be moved into the path of the selecting lever 28. A spring 39, connected to the locking dog 36, tends to move the tooth 38 into the path of lever 26, but when the master wheel carriages are in their starting position, the sector 18 occupies a position as shown in Figs. IV, IX and XVI, and the spring 39 then merely forces the dog 36 into engagement with sector 18, the latter serving as a stop to prevent the tooth 38 (Fig. XVI) from moving into the path of the selecting lever 28. The lever 28 can then be operated for the purpose of selecting one of the accumulators. 36' designates a locking dog pivoted at 37' and provided with an extended lug 40 adapted to engage the sector 19. The free end of locking dog 36' may be moved into the path of the selecting lever 28' to prevent movement of said lever. 41 designates a spring (Figs. IV and XVI) tending to move the dog 36 to its operative position wherein its free end lies in the path of lever 28'. When the master wheel carriages occupy their starting positions, the lug 40 on the locking dog 36' (Figs. IX and XVI) engages the sector 19 to retain said locking dog in an idle position beyond the path of lever 28'.

It will now be understood that when both master wheel carriages occupy their starting positions the sectors 18 and 19 occupy the positions shown by Figs. IX and XVI, wherein they retain the locking dogs 36 and 36' beyond the paths of the selecting levers 28 and 28'. Either or both of the selecting levers can then be operated for the purpose of selecting one or both of the accumulators, but when the shaft 20 and sectors 18 and 19 are driven for the purpose of moving the master wheel carriage, or carriages, both locking dogs 36 and 36' are permitted to move toward the selecting levers 28 and 28'. Supposing that the selecting lever 28 has been moved in the direction indicated by an arrow in Fig. XVI to select one of the master wheel carriages; if motion is imparted to the shaft 20 so as to transmit movement to the selected carriage, both sectors 18 and 19 will immediately move upwardly from the locking dogs (Figs. IX and XVI), thereby permitting the spring-actuated dog 36' to move into the path of the selecting lever 28', while the locking dog 36 will merely be moved into engagement with the bottom face of the shifted lever 28. By automatically locking one of the selecting levers in this manner, we prevent the operator from accidentally selecting an accumulator when the denominational position of its master wheel does not agree with the denominational position of the other master wheel.

*Transmitting movement from key levers to the rotary master wheel shaft.*

The key levers 42 (Figs. I and VI) form part of the typewriting machine, and they may be considered as the numeral key levers with which typewriting machines are ordinarily equipped, it being unnecessary to change the keyboard of the typewriting machine used with our calculating attachment. 43 designates key lever extensions (Figs. I and VI), each of which is secured to one of the numeral key levers 42 and provided with a pin 44 through which motion is transmitted to the calculating machine. Vertically guided slide bars 45 (Figs. III, V and VI) are connected by means of levers 46 to the key extensions 43, each of said levers 46 (Fig. VI) being pivoted to the upper end of one of the vertical slide bars 45 and provided with a hook adapted to receive the pin 44 on one of the key extensions 43. These connecting levers 46 are used to transmit power from the numeral keys to the slide bars 45, and each of said levers 46 can occupy the operative position shown by full lines in Figs. I and VI, wherein the hook at the upper end of the lever is engaged with pin 44 on a key extension, or said levers 46 can be shifted to the idle positions shown by dotted lines in Fig. I, so as to allow the numeral keys to be operated without transmitting movement to the calculating mechanism. The means for shifting the levers 46 will be hereinafter described.

There are ten of the vertical slide bars 45 (Figs. V and VI) representing the digits 0 to 9, inclusive, and each of these slide bars, excepting the bar associated with the 0 key, is provided with means for transmitting movement to an oscillatory digit wheel shaft 47. 47' designates a restoring spring tending to retain the digit wheel shaft 47 in the position shown in the drawings (Figs. V and VI), wherein an arm $47^a$ (Fig. V), extending from one end of said shaft, engages a stationary stop pin $47^b$. The slide bar 45 associated directly with the 1 key will drive the digit wheel shaft 47 a distance corresponding to one step of the calculating operation, the slide bar 45 representing the digit 2 being adapted to drive said shaft 47 a distance of two steps, etc., the 9 key being adapted to drive said shaft nine steps.

To accomplish this, each of the slide bars 45 representing the digits 1 to 9, inclusive, may be provided with a predetermined number of rack teeth adapted to mesh with a toothed digit wheel 48 (Figs. V, VI and VII), the digit wheels being rigidly secured to the digit wheel shaft 47. The slide bar 45 driven by the 0 key does not transmit movement to the digit wheel shaft 47, and this particular slide bar may have plain longitudinal edges, as shown in Fig. I. It will now be understood that the numeral keys representing digits 1 to 9, inclusive, are used to actuate slide bars 45 whereby the digit wheel shaft 47 is actuated, and the degree of movement imparted to the digit wheel shaft will depend upon the value of the key from which motion is transmitted.

The means for transmitting movement from the digit wheel shaft 47 to the master wheel shaft 5 is shown most clearly in Figs. V, VI and VII. The digit wheel shaft 47 oscillates in response to the movements of the vertical rack bars 45, but the master wheel shaft is driven continually in only one direction during the adding operations. 49 designates a ratchet wheel fixed to the digit wheel shaft 47, and 50 designates a gear wheel loosely mounted on said shaft. A pawl 51, engaging the ratchet wheel 49, is pivotally secured to the gear wheel 50. The train of gearing through which motion is transmitted comprises a large gear 52 meshing with the gear wheel 50, a smaller gear 53 meshing with the large gear 52, a pinion 54 meshing with the gear 53, and a shiftable gear 55 (Figs. V and VIII) adapted to mesh with the pinion 54 for subtraction, and also adapted to mesh with the gear 53 for addition. This shiftable gear 55 is splined to the master wheel shaft 5. Pawls 56 coöperate with the large gear wheels 52 to prevent retrograde movement of the train of gearing. This train of gearing, including the ratchet and pawl 49, 51 (Fig. VII), transmits rotary movement to the master wheel shaft 5 in response to the oscillatory movements of the digit wheel shaft 47, and when the machine is in service the master wheel (or wheels) travels along the shaft 5, advancing step by step from one accumulator wheel to another, so as to successively actuate the different total wheels. For example, to introduce the numeral 29 into an accumulator, the 2-key is depressed while the master wheel registers with an accumulator wheel 4 in the tens order. The total wheel in the tens order is thus turned 2 steps, and the master wheel is then driven by the platen carriage so as to pass to the units order. Thereupon, the 9-key is depressed, with the result of actuating the total wheel in the units order, driving it nine steps.

*Subtraction.*

In subtracting one number from another, the master wheel shaft must be rotated reversely to the direction in which it is driven for addition. The relatively wide or thick reversing pinion 54 (Figs. V and VIII) is therefore permanently in mesh with the gear wheel 53 through which motion is transmitted from the digit wheel shaft to the master wheel shaft, and the shiftable gear wheel 55 on the master wheel shaft can mesh directly with the pinion 54 to subtract numerals from the accumulator, and said gear wheel 55 can be shifted to the right from the position shown in Fig. V so as to pass from the reversing pinion 54 to the gear wheel 53. The shiftable gear wheel 55 (Figs. V and VIII) is provided with clutch teeth adapted to interlock with clutch collars 57 fixed to said master wheel shaft.

The means for shifting the gear wheel 55 (Figs. V and VIII) comprises a bell crank lever 58 pivotally supported at 59 and provided with an arm which engages a collar on the hub of said wheel 55. The other arm of the bell crank lever 58 is recessed to receive a finger 60 at the lower end of an operating lever 61, the latter being pivoted at 62. By operating the lever 61 motion can be transmitted through the elements just described, for the purpose of shifting the gear wheel 55 on the master wheel shaft 5, and said wheel 55 is thus shifted by hand so as to be placed in mesh with either the gear wheel 53 for addition or the reversing pinion 54 for subtraction.

*Disconnecting the numeral keys from the calculating mechanism.*

We have previously referred to the connecting levers 46 (Figs. I and VI) having hooks whereby the numeral keys are detachably connected to the calculating mechanism. Each lever 46 has a depending leg 63 which extends between a pair of long horizontal rods 64 (Figs. I, III and VI) secured to oscillatory arms 65. These arms 65 are actuated to move the levers 46 to connect the calculating mechanism to the typewriter and to disconnect the calculating mechanism when the numeral keys are to be operated independently of the calculating mechanism. The arms 65 are fixed to an oscillatory shaft 66 provided with an operating arm 67. A spring 68 (Figs. I, III and V) tends to move the arms 65 toward the front of the machine, thereby tending to connect the levers 46 to the numeral key levers. Note that the operating arm 67 (Figs. I, III and V) is adapted to engage an arm 69 on the long shaft 20 and that the spring 68 tends to lower the operating arm 67. If the shaft 20 is turned in one direction, it will elevate the arm 69 and thereby move the operating arm 67 and connecting levers 46 from the positions shown by full lines in Fig. I to the positions shown by dotted lines, thereby disconnecting the calculating mechanism from the key levers. If the shaft 20 is turned in the opposite direction, it will lower the arm 69, and thereby permit the spring 68 (Figs. I and II) to connect the calculating mechanism to the key levers. It will therefore be understood that the oscillatory shaft 20, which transmits movement from the platen carriage to the master wheel carriages, also serves as means for connecting and disconnecting the key levers. When the platen carriage of the typewriter reaches a predetermined field, it begins to transmit movement to the long shaft 20, so as to actuate one or both master wheel carriages, and when the platen carriage passes from said field it releases the shaft 20 and permits the latter to be restored by a spring 70 (Figs. I and III), thereby causing the arm 69 to engage and elevate the operating arm 67 so as to disconnect the calculating mechanism from the key levers.

In addition to this automatic means for connecting the typewriter to the calculating mechanism, we have shown a hand operated lever 71 (Figs. I, III, V and VIII) which may be used for the same purpose.

A spring 72 tends to retain the bell crank lever 71 in the position shown by Fig. VIII. 73 designates an intermediate lever (Figs. I, V and VIII) whereby movement is transmitted from the bell crank lever 71 to an arm 74 extending from one of the arms 65 on the shaft 66. Obviously, the bell crank lever 71 can be operated by hand to elevate the rear end of the intermediate lever 73, thereby elevating the arm 74 to disconnect the hooked levers 46 from the key levers. After the lever 71 has been shifted to disconnect the hooked levers 46, said lever may be held by the operator, or if desired a suitable mechanical device could be employed to retain said lever in the position to which it is shifted.

*Connecting the master wheel carriages to transmit movement from one carriage to the other.*

This device is a detachable connecting link adapted to transmit movement from one master wheel carriage to the other. It is controlled by mechanism at the rear of the machine, which will be hereinafter described. 75 designates a driving link or connecting link, shown most clearly in Fig. IX, said link being pivoted at 76 to the master wheel carriage C and provided with a hook adapted to interlock with a pin 77 on the master wheel carriage D. A spring 78, yieldingly connecting the link 75 to a part of the carriage C, tends to retain the link in interlocking engagement with the pin 77. 79 designates a tripping device in the form of a bell crank lever having a tooth 80 (Fig. IX), adapted to be engaged by a short arm 81 depending from the link 75. A spring 82 tends to retain the bell crank lever 79 in the position shown by Fig. IX. Assuming that the lever 79 is held in the last mentioned position, if the carriage D has then advanced to the left from the position shown in Fig. IX, the link 75 will at first tend to move with the carriage D, but the short arm 81 depending from the link will engage the shoulder 80 on the tripping lever 79, so as to disconnect the link from the pin 77. When the carriage D begins its movement to the left, the short arm 81 is forced into engagement with the shoulder 80, and a continued longitudinal movement of the link 75 with the carriage D will result in the link 75 moving downwardly about the axis of its pivot 76, and this movement will disconnect the link from pin 77 on the carriage D. Assuming that the carriage C is advanced to the left while the tripping link 79 is held in the position shown by Fig. IX, at the beginning of this movement the link 75 will quickly disconnect from the carriage D, for the reason that the short arm 81 will immediately coöperate with the shoulder 80 to move the link 75 downwardly. Therefore, whenever the tripping lever 79 is held in the position shown by Fig. IX, the master wheel carriages C and D may be advanced independently of each other, for the connecting link 75 cannot then be used to transmit movement from one carriage to the other. However, if the tripping lever 79 is displaced so as to locate its shoulder 80 entirely below the path of the short arm 81, the link 75 will transmit movement from one carriage to the other. In this event, while the tripping lever 79 is displaced from the position shown in Fig. IX, both master wheel carriages will travel simultaneously, even though the rack bar 17 on only one of said carriages is in mesh with a sector on the long arm 20.

In performing certain calculations, or combinations of calculations, we desire to actuate the individual accumulator independently of the grand accumulator when the platen carriage occupies certain fields, and to actuate both accumulators simultaneously when the platen carriage is in another field. In accomplishing this, we allow the tripping lever 79 to remain in the position shown by Fig. IX when the individual accumulator is to be operated independently of the grand accumulator, and we automatically displace said tripping lever 79 when both accumulators are to be operated simultaneously. The mechanism for controlling the tripping lever 79 will be hereinafter described.

*Connecting the platen carriage to the means for feeding the master wheel carriages.*

When the platen carriage of the typewriter reaches a predetermined position, it begins to transmit movement to the means for feeding the master wheel carriages, and after the selected master wheel passes entirely across its accumulator, the feeding means is disengaged from the platen carriage, permitting the latter to continue in motion without advancing the master wheel. We have already briefly described the means for transmitting movement from the traveling platen carriage to the traveling master wheel carriages, and attention is now directed to the means whereby the platen carriage is connected to and disconnected from the long feeding lever 22 at the rear of the typewriting machine. This feeding lever (Figs. I, II, X, XI and XIV) is in the form of a sector meshing with the sector 21 at the rear of the long inclined shaft 20 through which movement is transmitted to the master wheel carriages at the front of the machine. The power transmission pins 25, adjustably secured to the rear portion of the platen carriage, form part of the means for connecting said carriages to the feeding lever 22. 83 designates a restoring spring tending to retain the lever 22 in the position shown by Fig. II. An elongated trippable abutment finger 84 is pivotally mounted on a pin 85 (Figs. X and XI) carried by the long lever 22, the axis of the pivot being approximately parallel with the path of the platen carriage. This trippable finger 84 extends into the path of the pins 25, so as to transmit movement from said pins to the lever 22. As shown most clearly in Figs. X and XI, 86 designates a spring tending to retain the finger 84 in engagement with an edge 87 of the lever 22. When the finger 84 occupies the last mentioned position, it lies in the path of the traveling pins 25. 88 designates an angular retaining lever having a finger 89 (Figs. X and XI) movable into the path of the traveling pins 25 so as to coöperate with the finger 84 in connecting the platen carriage to the long lever 22. A spring 90 tends to retain the lever 88 in the position shown by Figs. X and XI, wherein said lever 88 engages a stop pin 91 on the long lever 22, while its retaining finger 89 lies in the path of the pins 25. However, when the long lever 22 occupies its starting position, the lever 88 is displaced to the position shown by Fig. II, wherein its retaining finger 89 lies entirely above the paths of the traveling pins 25. At this time, a finger 92 on the retaining lever 88 engages a stationary abutment 93, the latter being fixed to a stationary part of the machine.

When one of the traveling pins 25 strikes the finger 84, it begins to transmit movement to the long lever 22, and as this lever moves from its starting position the finger 92 will pass from the stationary abutment 93 (Fig. X) and the spring 90 will then move said lever 88 to the position shown in Fig. X, wherein the retaining finger 89 lies in the path of the traveling pins 25. Movement can then be transmitted in either direction from the pin 25 to the large feeding lever 22, and under these conditions the latter cannot be accidentally thrown, or otherwise moved, independently of the traveling pin 25.

When the selected master wheel passes entirely across its accumulator, the elongated abutment finger 84 is tripped to permit the spring 83 to restore the large feeding lever 22. The means for tripping the abutment finger 84 (Figs. II, X and XI) comprises a stationary cam 94 having an inclined face which lies in the path of the lower end of finger 84. When the lower end of finger 84 slides along the inclined face of stationary cam 94, said lower end of the finger moves inwardly while the upper end moves outwardly to a position beyond the path of the traveling pins 25. The finger 84 is thus disengaged from the pin 25, and the spring 83 then quickly restores the long lever 22 to the starting position shown by Fig. II. It will now be understood that a series of the traveling pins 25 can be mounted on the platen carriage as shown by Fig. II, and that each of said pins will transmit movement to the long lever 22 whereby the master wheel carriages are actuated. When the first pin 25 of the series passes from the trippable finger 84, the large lever 22 is restored to its starting position, and the trippable finger 84 then lies in the path of the second pin 25.

After a traveling pin 25 is disengaged from the trippable finger 84, the platen carriage can continue in motion for ordinary typewriting, and when the platen carriage is eventually restored, the traveling pins 25 will pass idly along the trippable finger 84, merely turning the latter on its pivot 85 without actuating the large feeding lever 22. To understand the last mentioned feature is should be noted that the inner face of the finger 84 is beveled to provide an inclined cam, as shown by Fig. XII. A pin traveling to the right from the position shown in Fig. XII will engage the relatively thick edge of the finger 84, but when the platen carriage is restored the pins 25 will move to the left from the position shown by Fig. XII, and they will then strike the inclined inner face of the finger 84 so as to idly move said finger on its pivot 85.

*Automatically selecting the master wheel carriages.*

Assuming that the sector 19 on the long inclined shaft 20 is in mesh with the rack bar 17 of the master wheel carriage C, while the sector 18 is disengaged from its rack bar, as shown by Fig. VI, the master wheel carriage C will then be driven directly by the sector 19 and shaft 20. The manually operated selecting levers 28 and 28' are manipulated for the purpose of shifting the sectors to the positions shown by Figs. I and VI, but we have also shown automatic means for determining whether one or both of the master wheel carriages will move in response to the motion of the sector 19. We have already shown that each of the traveling pins 25 on the rear of the platen carriage constitutes a means for transmitting movement to the long lever 22, whereby the long inclined shaft 20 and the sectors 18—19 are actuated, and each of these pins 25 may be termed "an automatic selector" for the reason that it coöperates with the sectors 18 and 19 to select the master wheel carriage to be driven by the platen carriage. If the sectors 18 and 19 lie in the positions shown by Figs. I and VI, the master wheel carriage C, associated wth the individual accumulator, will be selected and actuated whenever a traveling pin 25 operatively engages the finger 84 on the large lever 22 at the rear of the machine. We have also shown another automatic selector for determining whether the carriage D of the grand accumulator will travel with the carriage C of the individual accumulator. The last mentioned selecting device includes a selector 25' in the form of a clip adjustably mounted on the rear of the platen carriage, and means for transmitting movement from said selector to the tripping lever 79 (Fig. IX).

It will be remembered that the tripping lever 79 may occupy the position shown in Fig. IX to prevent the transmission of movement from one of the master wheel carriages to the other, and that said tripping lever 79 may be displaced to permit the connecting link 75 to transmit movement from one of said carriages to the other. The means for displacing the tripping lever 79 comprises a bell crank lever 95 (Figs. III, IV and IX) mounted under the base of the machine and having an arm engaging the lower end of the tripping lever 79. A restoring spring 96 tends to retain the bell crank lever 95 in an idle position wherein it engages a stop pin 97. 98 designates a long connecting rod whereby bell crank lever 95 is connected to a bell crank 99 near the rear of the machine. A bell crank 100 (Figs. I, II and IV) is provided at its lower end with a screw adapted to engage the bell crank 99 for the purpose of transmitting movement through the connecting rod 98 and lever 95 to the tripping lever 79. A roller 101 (Fig. II), at the upper end of bell crank 100, lies directly below an elongated arm 102 pivoted to the large lever 22. An upright rod 103 connects the arm 102 to a bell crank 104, the latter being pivoted to the large lever 22. The upper end of bell crank 104 normally lies in the path of the selector 25' (Figs. II, X and XI), which travels with the platen carriage.

The selector 25', when combined with the other elements of the machine as shown in the drawings, is intended to place the grand accumulator under the control of the platen carriage. To accomplish this (Figs. II, X and XI) the lower end of the traveling selector 25' engages the upper end of bell crank 104 so as to actuate said bell crank immediately before the traveling selector pin 25 engages the finger 84. In other words, the bell crank 104 is actuated before motion is transmitted from the traveling selector pin 25 to the large lever 22. When the lever 104 is actuated in this manner, motion is transmitted from said lever through rod 103, arm 102, bell crank 100, bell crank 99, long connecting rod 98 and bell crank 95, to the tripping lever 79, the latter being shown most clearly in Fig. X. When the tripping lever is actuated in this manner by the selector 25', said tripping lever is displaced so as to lie entirely below the short arm 81 on the connecting link 75 (Fig. IX). The tripping lever 79 is thus displaced so it will not in any way interfere with the connecting link 75 whereby the two carriages C and D are connected together. When the master wheel carriage D is then driven through the medium of one of the sectors on the long shaft 20, motion will be transmitted from said carriage D through the connecting link 75, to the carriage C associated with the grand accumulator. Both master wheels will then be driven by only one of the sectors on the shaft 20, and the numerals will be simultaneously registered in both accumulators.

Fig. XVII is an illustration of work which may be done when the automatic selectors 25 and 25' are mounted on the traveling platen carriage, as shown in Fig. II, while the sectors 18 and 19 are positioned as shown in Figs. I and VI, the sector 19 being in mesh with its rack bar while the sector 18 is disengaged from its rack bar. The first item written in this example is the numeral "7" to indicate the clerk No., and when this is done the calculating mechanism is disconnected from the typewriter. The date, "Apr. 9" and the items "1 pr. shoes" are also written while the calculating mechanism is disconnected from the typewriter. The next item "5.00" is written in the "Charges" column, and this is done while both of the selectors 25 and 25' are in their operative positions, as shown by Fig. X. "5.00" will therefore be recorded in both accumulators, and as the platen carriage continues its motion, the selectors 25 and 25' will pass from the elements at the upper end of the large lever 22, permitting said lever to be restored as previously pointed out. The operator then moves the lever 61 to place the shiftable gear 55 in engagement with the reversing pinion 54 to set the gearing for subtraction. Thereafter, the selector pin 25 shown at the extreme left in Fig. II will engage the finger 84 to actuate the individual accumulator alone. If "5.00" is then written in the "Balance" column (Fig. XVII), the individual accumulator will be cleared or reset to zero for the reason that the 5.00 will be subtracted therefrom, and this will be done without in any way interfering with the grand accumulator, which is intended to indicate the total of all the individual items. Assuming that the customer's old balance is 5.00, as shown at the left of Fig. XVII, this amount may be written after the selector pin 25 at the right of Fig. II has reached the finger 84, so as to actuate the individual accumulator alone. If the individual accumulator has been set for addition, it will then indicate 5.00. The next item to be introduced into the accumulator is a charge of 6.00, and this is done while the selector 25' and the adjacent selector pin 25 are both engaged with the elements at the upper end of large lever 22. 6.00 will then be added in both accumulators, and the total represented by the individual accumulator will be 11.00, this being the new balance resulting from the addition of the charge 6.00 to the old balance of 5.00. The machine is then set for subtraction and the platen carriage is shifted until the selector pin 25 at the extreme left of Fig. II is operatively engaged with the elements at the upper end of large lever 22. The operator will then observe the individual accumulator and find that the new balance is 11.00. When this amount is written it will be subtracted from the individual accumulator so as to reset the latter to zero. From the foregoing description it will be apparent that different kinds of work and various different examples, involving the use of several columns, may be performed by properly setting the automatic selectors on the rear of the platen carriage and by properly manipulating the hand operated selectors 28 and 28' at the front of the machine. To reset the grand accumulator, the levers 28 and 28' are positioned to drive the master wheel carriage of the grand accumulator only, and the lever 61 is set for subtraction. One of the traveling selector pins 25 at the rear of the platen carriage is thus operatively engaged with the elements at the upper end of large lever 22, while the numeral keys are actuated to write the amount indicated by the grand accumulator. This amount is then subtracted from the grand accumulator, so as to reset it to the zero position.

To render the calculating mechanism inoperative (Figs. X, XI, XIV and XV), the trippable finger 84 and the bell crank lever 104 are displaced so as to lie entirely beyond the paths of the selectors 25 and 25' on the platen carriage. 105 designates an operating lever pivoted to the large lever 22 and provided with a cam 106 adapted to engage the inner face of the finger 84. When this lever 105 is shifted to the position shown by Fig. XIV, its cam 106 displaces the finger 84 from an operative position shown by dotted lines in Fig. XV to an inoperative position shown by full lines. When the finger 84 is shifted to the last mentioned position, it lies beyond the path of the selector pins 25, and said pins can then travel as indicated by arrows in Figs. XIV and XV, without striking the finger 84. To render the bell crank lever 104 inoperative, the lever 105 is provided with a pin 107 adapted to engage the upper end of said lever 104 to displace it from the path of the selector 25'.

*Restoring the master wheel carriages.*

We have previously referred to springs 14 whereby the master wheel carriages, or denominational carriages, are restored independently of each other, and we have referred to the connecting link 75 (Fig. IX) whereby motion may be transmitted from one carriage to the other so as to advance both carriages simultaneously. We now desire to direct attention to the means whereby the link 75 is disconnected to permit the springs 14 to restore the carriages independently of each other. Referring more particularly to Figs. V and IX, 108 designates a tripping dog located in the path of a pin 109 which extends from the link 75. The dog 108 is pivoted at 110, and a spring 111 normally retains said dog in engagement with a stop pin 112. When both of the carriages C and D are advanced simultaneously, the pin 109 passes over the top face of the tripping dog 108, moving said dog downwardly a slight distance, but when the carriages are restored, said pin 109 passes under the upper end of dog 108, and said pin 109 then travels under the dog, the latter serving as a cam for disconnecting the link 75 from the pin 77. The carriages are thus disconnected from each other during their return movement, and the springs 14 are permitted to restore said carriages independently of each other.

An ordinary typewriter is usually equipped with a tabulating key, which may be operated to release the escapement of the platen carriage so as to permit said carriage to jump quickly to a predetermined position. Under some circumstances, the operator may depress the tabulating key while both of the selectors 25 and 25' are operatively engaged with the elements at the upper end of long lever 22, and the platen carriage may then be permitted to jump quickly to another position wherein only one of the master wheel carriages is to be displaced by the motion transmitted from one of the traveling selector pins 25. In this event, the master wheel carriages may not have time to return to their starting positions before one of said carriages is again picked up through the medium of a selector pin 25. However, the master wheel carriages will be disconnected through the medium of the dog 108 (Fig. IX) so that the carriage which has not been selected for the next operation can return freely to its starting position.

*Stop device actuated by tabulating key.*

When the tabulating key of a typewriter is depressed, the platen carriage moves quickly to a predetermined position, and when the tabulating key rises from its depressed position, the platen carriage is usually permitted to jump a slight distance. It sometimes happens that an operator will depress the tabulating key and then strike a numeral key while the tabulating key is in the depressed position. In this event the numeral will not be properly recorded for the master wheel carriage will not reach its proper position until the tabulating key rises from its depressed position. We therefore provide means for rendering the calculating mechanism inoperative when the tabulating key occupies a depressed position. This means comprises a stop plate 113 (Figs. I, III, V and VI) fixed to an oscillatory rod 114 provided with an operating arm 115. This stop plate 113 normally occupies the inoperative position shown in the drawings, but it is adapted to be located in the paths of abutment fingers 116 extending downwardly from levers 117, said levers being loosely mounted on a pivot rod 118. Each lever 117 extends between two pins on one of the vertical slide bars 45, as shown in Figs. V and VI, so that one of the levers will oscillate in response to the vertical movement of each slide bar 45. If the stop plate 113 (Fig. VI) is shifted so as to lie in the paths of the fingers 116, all of the levers 117 will be prevented from moving downwardly, and all of the slide bars 45 will therefore be positively held in elevated positions and prevented from moving with the key levers. The calculating mechanism may be thus rendered inoperative by merely locating the stop plate 113 in the paths of the abutment fingers 116. 119 designates restoring springs connected to the levers 117 (Figs. III and VI) for the purpose of restoring the vertical slide bars 45.

The stop plate 113 is actuated by the tabulating key to render the calculating mechanism inoperative while the tabulating key occupies a depressed position. 120 designates a tabulating key (Figs. I and V) mounted over a head 121 at the upper end of a vertical rod 122, said rod having an enlarged portion 122' and an extended lower end 123 to which a restoring spring 124 is connected. The spring 124 tends to retain the rod 122 in the elevated position shown by Fig. I, and said rod 122 is moved downwardly through the medium of the tabulating key 120. The enlarged portion 122' of the rod 122 serves as a cam for actuating a bell crank lever 125 (Fig. I), said bell crank lever having a short arm which extends into the path of the enlarged portion 122' and also having a long arm provided with a pin 126 which extends into the path of the operating lever 115. At the beginning of the downward movement of the tabulating key, the enlarged portion 122' of rod 122 (Fig. I) engages and displaces the bell crank 125 so as to transmit movement to the operating arm 115, thereby shifting the stop plate 113 into the paths of all of the fingers 116 on the levers 117. The stop plate 113 is thus positioned to prevent operation of the numeral keys, and when the tabulating key is restored to its elevated position, the stop plate 113 is restored by means of a spring 127.

We claim:

1. The combination of a typewriter having a platen carriage, and calculating mechanism comprising a plurality of accumulators each provided with an actuator and a traveling denominational carriage movable step by step to change the denominational relation of the actuator to the accumulator, operating means whereby motion is transmitted from said platen carriage to one of said denominational carriages, said operating means being provided with a selector on said platen carriage whereby the last mentioned denominational carriage is selected, and detachable connecting means for transmitting movement from the last mentioned denominational carriage to the other denominational carriage.

2. The combination of a typewriter having a platen carriage, and calculating mechanism comprising a plurality of accumulators each provided with an actuator and a traveling denominational carriage movable step by step to change the denominational relation of the actuator to the accumulator, operating means whereby motion is transmitted from said platen carriage to one of said denominational carriages, said operating means being provided with a selector on said platen carriage whereby the last mentioned denominational carriage is selected, and a driving connection whereby movement is transmitted from the last mentioned denominational carriage to the other denominational carriage.

3. The combination of a typewriter having a platen carriage, and calculating mechanism comprising a plurality of accumulators each provided with an actuator and a traveling denominational carriage movable step by step to change the denominational relation of the actuator to the accumulator, operating means whereby motion is transmitted from said platen carriage to one of said denominational carriages, said operating means being provided with a selector on said platen carriage whereby the last mentioned denominational carriage is selected, a driving connection whereby movement is transmitted from the last mentioned denominational carriage to the other denominational carriage, and means for controlling said driving connection to permit said denominational carriages to travel either simultaneously or independently of each other.

4. The combination of a typewriter having a platen carriage, and calculating mechanism comprising a plurality of accumulators each provided with an actuator and a traveling denominational carriage movable step by step to change the denominational relation of the actuator to the accumulator, operating means whereby motion is transmitted from said platen carriage to one of said denominational carriages, said operating means being provided with a selector on said platen carriage whereby the last mentioned denominational carriage is selected, a driving connection whereby movement is transmitted from the last mentioned denominational carriage to the other denominational carriage, and a second selector whereby said driving connection is controlled to permit said denominational carriages to travel either simultaneously or independently of each other.

5. The combination of a typewriter having a platen carriage, and calculating mechanism comprising a plurality of accumulators each provided with an actuator and a traveling denominational carriage movable step by step to change the denominational relation of the actuator to the accumulator, operating means whereby motion is transmitted from said platen carriage to one of said denominational carriages, said operating means being provided with a selector on said platen carriage whereby the last mentioned denominational carriage is selected, a driving connection whereby movement is transmitted from the last mentioned denominational carriage to the other denominational carriage, and a second selector whereby said driving connection is controlled to permit said denominational carriages to travel either simultaneously or independently of each other, said second selector being carried by said platen carriage.

6. The combination of a typewriter having a platen carriage, and calculating mechanism comprising a plurality of accumulators each provided with an actuator and a traveling denominational carriage movable step by step to change the denominational relation of the actuator to the accumulator, operating means whereby motion is transmitted from said platen carriage to one of said denominational carriages, a link whereby the last mentioned carriage is connected to the other denominational carriage, and a selector on said platen carriage whereby said link is controlled to control the transmission of movement from one of said denominational carriages to the other.

7. The combination of a typewriter having a platen carriage, and calculating mechanism comprising a plurality of accumulators each provided with an actuator and a traveling denominational carriage movable step by step to change the denominational relation of the actuator to the accumulator, operating means whereby motion is transmitted from said platen carriage to one of said denominational carriages, a driving link whereby said denominational carriages are detachably connected, and means whereby said link is automatically detached to permit one of said denominational carriages to travel independently of the other.

8. The combination of a typewriter having a platen carriage, and calculating mechanism comprising a plurality of accumulators each provided with an actuator and a traveling denominational carriage movable step by step to change the denominational relation of the actuator to the accumulator, operating means whereby motion is transmitted from said platen carriage to one of said denominational carriages, a driving link whereby said denominational carriages are detachably connected, and means whereby said link is automatically detached to permit one of said denominational carriages to travel independently of the other, the last mentioned means comprising a tripping abutment in the path of said link, and a selector on the platen carriage controlling said abutment.

9. The combination of a typewriter having a platen carriage, and calculating mechanism comprising a plurality of accumulators each provided with an actuator and a traveling denominational carriage movable step by step to change the denominational relation of the actuator to the accumulator, operating means whereby motion is transmitted from said platen carriage to one of said denominational carriages, a driving link whereby said denominational carriages are detachably connected, said driving link being pivoted to one of said denominational carriages and hooked onto the other, a tripping device whereby said driving link is unhooked from one of said carriages, and a selector on the platen carriage controlling said tripping device.

10. The combination of a typewriter having a platen carriage, and calculating mechanism comprising a plurality of accumulators each provided with an actuator and a traveling denominational carriage movable step by step to change the denominational relation of the actuator to the accumulator, operating means whereby motion is transmitted from said platen carriage to one of said denominational carriages, a driving link pivoted to one of said denominational carriages and detachably hooked onto the other denominational carriage, a tripping device comprising an abutment on said link and a pivotally mounted tripping arm coöperable with said abutment to unhook said driving link, a lever whereby said tripping arm is actuated, and a selector on the platen carriage through which motion is transmitted to said lever.

11. The combination of a typewriter having a platen carriage, and calculating mechanism comprising a plurality of accumulators each provided with an actuator and a traveling denominational carriage movable step by step to change the denominational relation of the actuator to the accumulator, operating means whereby motion is transmitted from said platen carriage to one of said denominational carriages, a driving connection whereby movement is transmitted from the last mentioned denominational carriage to the other denominational carriage, and selective means whereby said driving connection is actuated to control the transmission of movement from one of said denominational carriages to the other, said selective means comprising a traveling selector on the platen carriage, a pivoted abutment finger in the path of said traveling selector, an elongated arm actuated by said pivoted abutment finger, a driven lever adapted to be engaged by different portions of said elongated arm and means for transmitting movement from said driven lever to control said driving connection.

12. The combination of a typewriter having a platen carriage, and calculating mechanism comprising a plurality of accumulators each provided with an actuator and a traveling denominational carriage movable step by step to change the denominational relation of the actuator to the accumulator, traveling selectors carried by said platen carriage, operating means through which movement is transmitted from one of said traveling selectors to one of said denominational carriages, and means actuated by the other traveling selector to control the transmission of movement to the other denominational carriage.

13. The combination of a typewriter having a platen carriage, and calculating mechanism comprising a plurality of accumulators each provided with an actuator and a traveling denominational carriage movable step by step to change the denominational relation of the actuator to the accumulator, a traveling selector carried by said platen carriage, an oscillatory driven member actuated by said traveling selector, means for transmitting movement from said oscillatory driven member to one of said denominational carriages so as to advance the latter in synchronism with said platen carriage, a second traveling selector carried by said platen carriage, and means actuated by said second selector to control the transmission of movement to the other denominational carriage.

14. The combination of a typewriter having a platen carriage, and calculating mechanism comprising a plurality of accumulators each provided with an actuator and a traveling denominational carriage movable step by step to change the denominational relation of the actuator to the accumulator, traveling selectors carried by said platen carriage, an oscillatory driven member adjacent to said traveling selectors, fingers projecting from said oscillatory driven member and extending into the paths of the respective selectors, means whereby movement is transmitted from said oscillatory driven member to one of said denominational carriages so as to advance the latter in synchronism with said platen carriage, said driven member being actuated by one of said traveling selectors, and means actuated by the other selector to control the transmission of movement to the other denominational carriage.

15. The combination of a typewriter having a platen carriage, and calculating mechanism comprising a plurality of accumulators each provided with an actuator and a traveling denominational carriage movable step by step to change the denominational relation of the actuator to the accumulator, traveling selectors extending from said platen carriage, an oscillatory driven member adjacent to the platen carriage, fingers pivoted to said oscillatory driven member and extending into the paths of the respective selectors, means whereby movement is transmitted from said oscillatory driven member to one of said denominational carriages so as to advance the latter in synchronism with one of said selectors, and means actuated by the other selector and one of the pivoted fingers to control the transmission of movement to the other denominational carriage.

16. The combination of a typewriter having a platen carriage, and calculating mechanism comprising a plurality of accumulators each provided with an actuator and a traveling denominational carriage movable step by step to change the denominational relation of the actuator to the accumulator, traveling selectors extending from said platen carriage, an oscillatory driven member adjacent to the platen carriage, fingers pivoted to said oscillatory driven member and extending into the paths of the respective selectors, means whereby movement is transmitted from said oscillatory driven member to one of said denominational carriages so as to advance the latter in synchronism with one of said selectors, and means actuated by the other selector and one of the pivoted fingers to control the transmission of movement to the other denominational carriage, said denominational carriages being detachably connected together, and the last mentioned means being adapted to control the connection between said denominational carriages.

17. The combination of a typewriter having a platen carriage, and calculating mechanism comprising a grand accumulator and an individual accumulator each provided with an actuator and a traveling denominational carriage movable step by step to change the denominational relation of the actuator to the accumulator, traveling selectors carried by said platen carriage, means whereby movement is transmitted from a plurality of said traveling selectors to the denominational carriage of the individual accumulator, so as to actuate the latter when the platen carriage occupies different fields, and a controller for the grand accumulator actuated by another of said traveling selectors.

18. The combination of a typewriter having a platen carriage, and calculating mechanism comprising a grand accumulator and an individual accumulator each provided with an actuator and a traveling denominational carriage movable step by step to change the denominational relation of the actuator to the accumulator, traveling selectors carried by said platen carriage, means whereby movement is transmitted from a plurality of said traveling selectors to the denominational carriage of the individual accumulator, so as to actuate the latter when the platen carriage occupies different fields, and a controller for the grand accumulator actuated by another of said traveling selectors, said denominational carriages being connected together to provide for the transmission of movement from the carriage of the individual accumulator to the carriage of the grand accumulator, and said controller including a tripping device whereby said denominational carriages are disconnected to permit independent operation of the individual accumulator.

19. The combination of a typewriter having a platen carriage, and calculating mechanism comprising a plurality of accumulators each provided with an actuator and a traveling denominational carriage movable step by step to change the denominational relation of the actuator to the accumulator, a driving connection whereby said denominational carriages are connected together when in their starting positions, a releasing device adapted to disconnect said denominational carriages to permit independent movement thereof, traveling selectors carried by said platen carriage, means for transmitting movement from one of said traveling selectors to one of the connected carriages, and means under control of the other selector whereby the releasing device is actuated to disconnect the denominational carriages.

20. The combination of a typewriter having a platen carriage, and calculating mechanism comprising a plurality of accumulators each provided with an actuator and a traveling denominational carriage movable step by step to change the denominational relation of the actuator to the accumulator, a driving connection whereby said denominational carriages are connected together when in their starting positions, a releasing device adapted to disconnect said denominational carriages to permit independent movement thereof, traveling selectors carried by said platen carriage, means for transmitting movement from one of said traveling selectors to one of the connected carriages, and means under control of the other selector whereby the releasing device is actuated to disconnect the denominational carriages, said releasing device including a tripper whereby the driving connection is tripped and rendered inoperative at the beginning of the movement of one of the denominational carriages.

21. In a calculating machine, a plurality of accumulators each provided with an actuator and a traveling denominational carriage movable step by step to change the denominational relation of the actuator to the accumulator, means for connecting the denominational carriages, operating means whereby the connected denominational carriages are advanced simultaneously, said operating means being released from the connected denominational carriages when the latter reach predetermined positions, restoring springs tending to return said denominational carriages to their starting positions, and means for disconnecting said carriages from each other to permit the restoring springs to return them independently of each other.

22. In a calculating machine, a plurality of accumulators each provided with an actuator and a traveling denominational carriage movable step by step to change the denominational relation of the actuator to the accumulator, means for connecting the denominational carriages, operating means whereby the connected denominational carriages are advanced simultaneously, said operating means being released from the connected denominational carriages when the latter reach predetermined positions, restoring springs tending to return said denominational carriages to their starting positions, and means for disconnecting said carriages from each other to permit the restoring springs to return them independently of each other, the disconnecting means being effective after the operating means has been released from the connected denominational carriages.

23. In a calculating machine, a plurality of accumulators each provided with an actuator and a traveling denominational carriage movable step by step to change the denominational relation of the actuator to the accumulator, means for connecting the denominational carriages, operating means whereby the connected denominational carriages are advanced simultaneously, the connecting means including a detachable connecting link through which motion is transmitted from one of said denominational carriages to the other, said operating means being released from the connected denominational carriages when the latter reach predetermined positions, restoring springs tending to return said denominational carriages to their starting positions, and a tripping device whereby said link is disconnected to permit said springs to return the carriages independently of each other.

24. In a calculating machine, a plurality of accumulators each provided with an actuator and a traveling denominational carriage movable step by step to change the denominational relation of the actuator to the accumulator, means for connecting the denominational carriages, operating means whereby the connected denominational carriages are advanced simultaneously, the connecting means including a detachable connecting link through which motion is transmitted from one of said denominational carriages to the other, said operating means being released from the connected denominational carriages when the latter reach predetermined positions, restoring springs tending to return said denominational carriages to their starting positions, and a tripping device whereby said link is disconnected to permit said springs to return the carriages independently of each other, said tripping device comprising a pivotally mounted dog adapted to be engaged by said connecting link.

25. In a calculating machine, a plurality of accumulators each provided with an actuator and a traveling denominational carriage movable step by step to change the denominational relation of the actuator to the accumulator, means for connecting the denominational carriages, operating means whereby the connected denominational carriages are advanced simultaneously, the connecting means including a detachable connecting link through which motion is transmitted from one of said denominational carriages to the other, said operating means being released from the connected denominational carriages when the latter reach predetermined positions, restoring springs tending to return said denominational carriages to their starting positions, and a tripping device whereby said link is disconnected to permit said springs to return the carriages independently of each other, said tripping device comprising a pivotally mounted dog adapted to be engaged by said connecting link, and said dog being free to yield idly when said carriages are advanced by said operating means.

26. In a calculating machine, a plurality of accumulators each provided with an actuator and a traveling denominational carriage movable step by step to change the denominational relation of the actuator to the accumulator, means for connecting the denominational carriages, operating means whereby the connected denominational carriages are advanced simultaneously, the connecting means including a detachable connecting link through which motion is transmitted from one of said denominational carriages to the other, said operating means being released from the connected denominational carriages when the latter reach predetermined positions, restoring springs tending to return said denominational carriages to their starting positions, and a tripping device whereby said link is disconnected to permit said springs to return the carriages independently of each other, said tripping device comprising a yielding dog having a cam face in the path of a portion of the connecting link.

27. The combination of a typewriter having a platen carriage, and calculating mechanism comprising a plurality of accumulators each provided with an actuator and a traveling denominational carriage movable step by step to change the denominational relation of the actuator to the accumulator, means for connecting said denominational carriages, means whereby movement is transmitted from said platen carriage to the connected denominational carriages so as to advance the latter simultaneously, said denominational carriages being released from the platen carriage when the latter reaches a predetermined position, independent restoring means tending to return said denominational carriages, and means whereby said denominational carriages are disconnected from each other to permit them to return independently of each other.

28. The combination of a typewriter having a platen carriage, and calculating mechanism comprising a plurality of accumulators each provided with an actuator and a traveling denominational carriage movable step by step to change the denominational relation of the actuator to the accumulator, means for connecting said denominational carriages, means whereby movement is transmitted from said platen carriage to the connected denominational carriages so as to advance the latter simultaneously, said denominational carriages being released from the platen carriage when the latter reaches a predetermined position, independent restoring means tending to return said denominational carriages, and means whereby said denominational carriages are disconnected from each other to permit them to return independently of each other, the last mentioned means including a tripping device located in the path of a portion of the connecting means.

29. The combination of a typewriter having a platen carriage, and calculating mechanism comprising a plurality of accumulators each provided with an actuator and a traveling denominational carriage movable step by step to change the denominational relation of the actuator to the accumulator, a link detachably connecting said denominational carriages, means whereby movement is transmitted from said platen carriage to the connected denominational carriages so as to advance the latter simultaneously, said denominational carriages being released from the platen carriage when the latter reaches a predetermined position, independent restoring means tending to return said denominational carriages, and means for disconnecting said link to permit said denominational carriages to return independently of each other.

30. The combination of a typewriter having a platen carriage, and calculating mechanism comprising a plurality of accumulators each provided with an actuator and a traveling denominational carriage movable step by step to change the denominational relation of the actuator to the accumulator, a link detachably connecting said denominational carriages, means whereby movement is transmitted from said plater carriage to the connected denominational carriages so as to advance the latter simultaneously, said denominational carriages being released from the platen carriage when the latter reaches a predetermined position, independent restoring means tending to return said denominational carriages, and means for disconnecting said link to permit said denominational carriages to return independently of each other, the last mentioned means comprising a pivotally mounted tripping dog located in the path of a portion of said link, said tripping dog being free to yield idly when the link travels in one direction and being provided with a cam face whereby the link is tripped when it moves in the opposite direction.

31. In a calculating machine, a plurality of accumulators each provided with an actuator and a denominational carriage movable step by step to change the denominational relation of the actuator to the accumulator, operating means whereby motion is transmitted to the different denominational carriages, selective means controlling the transmission of movement to the different denominational carriages, said selective means being operable to select the carriages to be driven by said operating means, the selected carriages being movable step by step in corresponding denominational positions, and error-preventing means coöperating with said selective means to prevent the selection and operation of carriages in different denominational positions.

32. In a calculating machine, a plurality of accumulators each provided with an actuator and a denominational carriage movable step by step to change the denominational relation of the actuator to the accumulator, operating means whereby motion is transmitted to the different denominational carriages, selective means controlling the transmission of movement to the different denominational carriages, said selective means being operable to select the carriages to be driven by said operating means, the selected carriages being movable step by step in corresponding denominational positions, and error-preventing means coöperating with said selective means to prevent the selection and operation of carriages in different denominational positions, the last mentioned means including individual locking devices for preventing the transmission of movement from the selective means to the operating means.

33. In a calculating machine, a plurality of accumulators each provided with an actuator and a denominational carriage movable step by step to change the denominational relation of the actuator to the accumulator, operating means whereby motion is transmitted to the different denominational carriages, manually operated selective means for controlling the transmission of movement to the different denominational carriages, said selective means being operable to select carriages which occupy corresponding positions, and error-preventing means coöperating with said selective means to prevent the selection and operation of a plurality of the carriages in different denominational positions.

34. In a calculating machine, a plurality of accumulators each provided with an actuator and a denominational carriage movable step by step to change the denominational relation of the actuator to the accumulator, operating means whereby motion is transmitted to the different denominational carriages, manually operated selective means for controlling the transmission of movement to the different denominational carriages, said selective means being operable to select carriages which occupy corresponding positions, and error-preventing means coöperating with said selective means to prevent the selection and operation of a plurality of the carriages in different denominational positions, said error-preventing means including a device for rendering a portion of said selective means inoperative when one of said denominational carriages is located beyond its starting position.

35. In a calculating machine, a plurality of accumulators each provided with an actuator and a denominational carriage movable step by step to change the denominational relation of the actuator to the accumulator, operating means whereby motion is transmitted to the different denominational carriages, manually operated selective means including individual shifters for controlling the transmission of movement to the different denominational carriages, each of said individual shifters being associated with one of said denominational carriages so as to place the selected cariage under the control of said operating means, and error-preventing means whereby an individual shifter is rendered inoperative when the denominational carriage associated with another of said shifters passes from its starting position.

36. In a calculating machine, a plurality of accumulators each provided with an actuator and a denominational carriage movable step by step to change the denominational relation of the actuator to the accumulator, operating means whereby motion is transmitted to the different denominational carriages, said carriages being movable simultaneously in corresponding denominational positions, manually operated selective means controlling the transmission of movement of the different denominational carriages, said selective means being operable to select the carriages to be driven by said operating means, and error-preventing means controlled by said operating means to prevent the selection of one denominational carriage when another denominational carriage lies beyond its starting position.

37. In a calculating machine, a plurality of accumulators each provided with an actuator and a denominational carriage movable step by step to change the denominational relation of the actuator to the accumulator, operating means whereby motion is transmitted to the different denominational carriages, individual manually operated selecting members controlling the transmission of movement to the different denominational carriages, each of said selecting members being associated with one of said carriages, and error-preventing means whereby the selecting member of one carriage is rendered inoperative when another carriage passes from its starting position.

38. In a calculating machine, a plurality of accumulators each provided with an actuator and a denominational carriage movable step by step to change the denominational relation of the actuator to the accumulator, operating means whereby motion is transmitted to the different denominational carriages, individual manually operated selecting members controlling the transmission of movement to the different denominational carriages, and error-preventing means comprising locking members adapted to prevent operation of said selecting members, said locking members being controlled by said operating means so as to automatically lock the selecting member of one of said carriages when another of the carriages moves away from its starting position.

39. In a calculating machine, a plurality of accumulators each provided with an actuator and a denominational carriage movable step by step to change the denominational relation of the actuator to the accumulator, operating means whereby motion is transmitted to the different denominational carriages, individual manually operated selecting levers controlling the transmission of movement from said operating means to the different denominational carriages, and error-preventing means comprising individual locking members adapted to lie in the respective paths of the selecting levers, said locking members being movable in response to movements of said operating means so as to automatically lock the selecting lever of one carriage when another of said carriages moves from its starting position.

40. In a calculating machine, a plurality of accumulators each provided with an actuator and a denominational carriage movable step by step to change the denominational relation of the actuator to the accumulator, operating means whereby motion is transmitted to the different denominational carriages, operating means whereby movement is transmitted from said platen carriage to the denominational carriages, individual manually operated shifters controlling the transmission of such movement to the individual denominational carriages, said shifters being movable independently of each other to select the denominational carriages to be operated, and error-preventing means coöperating with said individual manually operated shifters to prevent the selection of two carriages in different denominational positions.

41. In a calculating machine, a plurality of accumulators each provided with an actuator and a denominational carriage movable step by step to change the denominational relation of the actuator to the accumulator, operating means whereby motion is transmitted to the different denominational carriages, operating means whereby movement is transmitted from said platen carriage to the denominational carriages, individual manually operated shifters controlling the transmission of such movement to the individual denominational carriages, said shifters being movable independently of each other to select the denominational carriages to be operated, and error-preventing means coöperating with said individual manually operated shifters to prevent the selection of two carriages in different denominational positions, said error-preventing means comprising locking members movable into the paths of said shifters and said locking members being movable in response to movements of said operating means.

42. The combination of a typewriter having a platen carriage, and calculating mechanism comprising an accumulator provided with an actuator and a traveling denominational carriage movable step by step to change the denominational relation of the actuator to the accumulator, and feeding devices whereby motion is transmitted from said platen carriage to said denominational carriage, said feeding devices comprising a traveling power transmission member carried by said platen carriage, a driven member through which motion is transmitted to said denominational carriage, a pair of abutment fingers pivoted to said driven member and extending into the path of the traveling member to provide for the transmission of movement to said driven member, said abutment fingers being separated from each other to receive the traveling member between them, and automatic means whereby said pivoted abutment fingers are deflected laterally to discontinue the transmission of movement, the last mentioned means comprising a stationary cam located in the path of one of said abutment fingers.

43. The combination of a typewriter having a platen carriage, and calculating mechanism comprising a plurality of accumulators each provided with an actuator and a traveling denominational carriage movable step by step to change the denominational relation of the actuator to the accumulator, traveling selectors carried by said platen carriage, a pair of pivotally supported power transmission members engaged by said traveling selectors to select the denominational carriages, and manually operated means coöperable with both of said power transmission members to retain them in idle positions beyond the paths of said traveling selectors.

44. The combination of a typewriter having a platen carriage, and calculating mechanism comprising a plurality of accumulators each provided with an actuator and a traveling denominational carriage movable step by step to change the denominational relation of the actuator to the accumulator, traveling selectors carried by said platen carriage, a pair of pivotally mounted power transmission members engaged by said traveling selectors to select the denominational carriages, and a manually operated cam coöperable with both of said pivotally mounted members to retain them in idle positions beyond the paths of said traveling selectors.

45. The combination of a typewriter having numeral keys and a platen carriage, and calculating mechanism comprising an accumulator provided with an actuator and a traveling denominational carriage movable to change the denominational relation of the actuator to the accumulator, operating means including an oscillatory member driven by said platen carriage, connectors whereby said numeral keys are operatively connected to said accumulators, yielding means tending to retain said connectors in their operative positions, and a disconnecting device operated by said oscillatory member to disconnect said connectors when the platen carriage occupies certain positions.

46. The combination of a typewriter having numeral keys and a platen carriage, and calculating mechanism comprising an accumulator provided with an actuator and a traveling denominational carriage movable to change the denominational relation of the actuator to the accumulator, operating means including an oscillatory member driven by said platen carriage, connectors whereby said numeral keys are operatively connected to said accumulators, yielding means tending to retain said connectors in their operative positions, and a disconnecting device operated by said oscillatory member to disconnect said connectors when the platen carriage occupies certain positions, said disconnecting means comprising an operating arm whereby said connectors are disconnected, and an arm extending from said oscillatory member to actuate said operating arm.

47. The combination of a typewriter having a tabulating key, numeral keys, an accumulator, operating means whereby movement is transmitted from said numeral keys to said accumulator, and locking means whereby said operating means is rendered inoperative when the tabulating key occupies a depressed position, said locking means including a universal stop member common to all of said numeral keys, said operating means being provided with key actuated abutments adapted to engage said universal stop member to prevent operation of all of said numeral keys, and means whereby movement is transmitted from said tabulating key to said universal stop member.

48. The combination of a typewriter having a tabulating key, numeral keys, an accumulator, operating means whereby movement is transmitted from said numeral keys to said accumulator, and means whereby said operating means is rendered inoperative when the tabulating key occupies a depressed position, the last mentioned means including abutments shifted by said numeral keys and an elongated stop member adapted to be engaged by all of said abutments to prevent operation of said numeral keys and means whereby motion is transmitted from said tabulating key to said elongated stop member so as to lock said numeral keys when the tabulating key occupies its depressed position.

In testimony that we claim the foregoing we hereunto affix our signatures.

EDWARD C. SCHINKE.
NORMAN A. SUTHERLAND.